(12) United States Patent
Sawdy

(10) Patent No.: US 6,357,715 B1
(45) Date of Patent: Mar. 19, 2002

(54) SUPPORT FOR A VEHICLE SEAT

(75) Inventor: Michael Barry Sawdy, Herts. (GB)

(73) Assignee: NMI Safety Systems, Ltd., London (GB)

( * ) Notice: Subject to any disclaimer, the term of this patent is extended or adjusted under 35 U.S.C. 154(b) by 0 days.

(21) Appl. No.: 09/520,593

(22) Filed: Mar. 8, 2000

(30) Foreign Application Priority Data

Mar. 10, 1999 (GB) ................................................ 9905515

(51) Int. Cl.$^7$ ................................................ F16M 13/00
(52) U.S. Cl. ........................ 248/424; 248/429; 248/430; 244/118.1; 74/531; 297/344.1; 296/65.13
(58) Field of Search ................................ 248/424, 429, 248/419, 503.1, 430, 680, 681, 188.1; 297/344.1; 296/65.13; 74/531; 244/118.1, 118.6

(56) References Cited

U.S. PATENT DOCUMENTS

| | | | | |
|---|---|---|---|---|
| 3,189,313 A | * | 6/1965 | Burns et al. ................. | 248/429 |
| 4,047,689 A | * | 9/1977 | Grendahl ................. | 248/503.1 |
| 4,114,947 A | * | 9/1978 | Nelson ..................... | 297/344.1 |
| 4,856,738 A | * | 8/1989 | Martin .................... | 244/122 R |
| 5,183,313 A | * | 2/1993 | Cunningham ............. | 297/344.1 |
| 5,337,979 A | * | 8/1994 | Bales et al. .............. | 244/118.1 |
| 5,937,706 A | * | 8/1999 | Sawdy ........................ | 74/531 |
| 6,189,852 B1 | * | 2/2001 | Hopley et al. .............. | 248/430 |

* cited by examiner

*Primary Examiner*—Anita King
(74) *Attorney, Agent, or Firm*—Harrison & Egbert

(57) ABSTRACT

A seat support for use with a vehicle seat and adapted to engage a floor-mounted track, the track having two inwardly directed lips on opposed sides of a slot. The seat support has a framework to support the seat, and which is provided with a clamping mechanism to engage the lips of the track. The clamping mechanism has two spaced apart plates, with the spaced apart plates having inwardly inclined lower regions. The lower edge of each plate carries an outwardly directed flange. A mechanism is provided to move the lower regions outwardly against an inherent resistance bias provided by the plates from an initial position in which the flanges may be inserted between the lips of the track to an outer clamping position in which the flanges engage the lips of the track. A knife element is mounted between the plates and is adapted to be moved between an upper position and a lower clamping position.

9 Claims, 4 Drawing Sheets

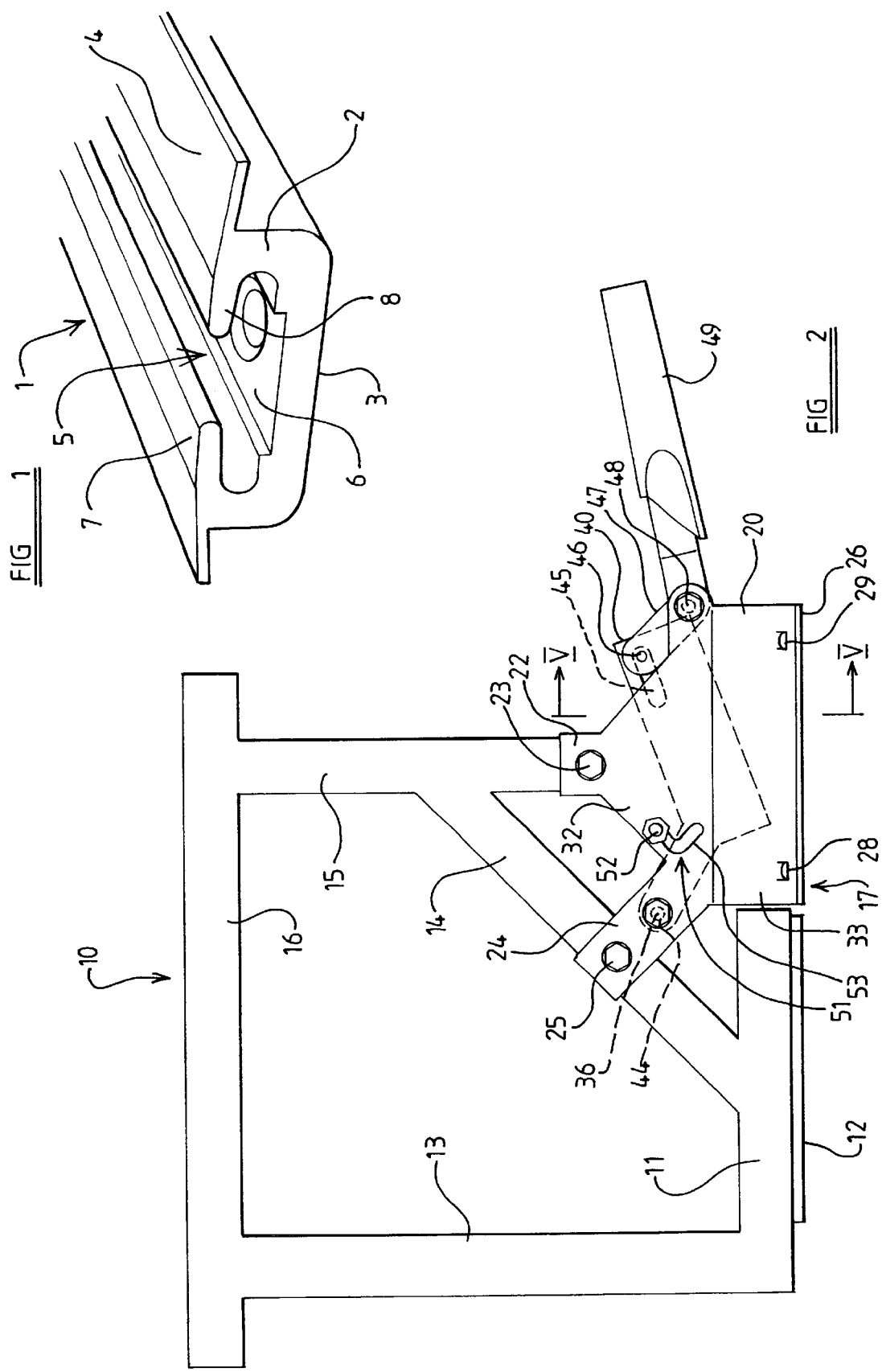

SUPPORT FOR A VEHICLE SEAT

TECHNICAL FIELD

The Present Invention relates to a seat support, and more particularly relates to a seat support suitable for use in a vehicle such as a motor vehicle.

BACKGROUND ART

It has been proposed previously to provide seats in vehicles which are mounted in position on elongate rails mounted in the floor of the vehicle. In the preferred arrangement the position of the seat is adjustable along the length of the rails and also, in the preferred arrangement, the seat may be removed from the rail. A seat support is provided on each side of the seat, and each seat support is adapted to engage and slide along a respective rail.

The present invention seeks to provide a seat support which may be used in this context.

SUMMARY OF THE INVENTION

According to this invention there is provided a seat support for use with a vehicle seat and adapted to engage a track provided on the floor of the vehicle. The track comprises two inwardly directed lips on opposed sides of a slot. The support has a framework adapted to support a seat, the framework is associated with a clamping mechanism adapted to engage the lips of the track. The clamping mechanism has two spaced apart plates. The spaced apart plates each have inwardly inclined lower regions. The lower-most edge of each plate carries an outwardly directed flange. Means are provided to move the lower regions outwardly against an inherent resilient bias provided by the plates from an initial position in which the flanges may be inserted between the lips of the track to an outer clamping position in which the flanges engage the lips of the track.

Preferably a knife element is provided which is mounted between the plates adapted to be moved between an upper position in which the knife element permits the lower edges of the plates to be biased inwardly, and a lower clamping position in which the knife forces the lower edges of the plates outwardly.

Conveniently the knife element is pivotally mounted in position.

Advantageously a lever is provided having a protruding handle, the lever being connected to the knife to move the knife pivotally.

Preferably a safety catch is provided to retain the knife in the lower position.

Advantageously the safety catch comprises an element extending transversely between the plates and guided within an elongate aperture of a predetermined configuration. The elongate element is movable between a first position in which it prevents upward movement of the knife element from the clamping position, and a second position in which it permits upward movement of the knife element from the clamping position.

Conveniently a lower part of the framework is provided with a protrusion, substantially aligned with said flanges, adapted to be inserted into a slot in the track.

Preferably the support comprises two vertical elements supporting an upper horizontal element. The horizontal element is provided with means to connect the horizontal element to a seat. The clamping mechanism is provided at the lower part of one of the vertical elements.

BRIEF DESCRIPTION OF THE DRAWINGS

The invention may be more readily understood, and so that further features thereof may be appreciated, the invention will now be described, by way of example, with reference to the accompanying drawings in which:

FIG. 1 is a perspective view of a track adapted to be mounted in a motor vehicle;

FIG. 2 is a side view of a seat support in accordance with the invention in a first condition;

DETAILED DESCRIPTION OF THE INVENTION

Figure 3:
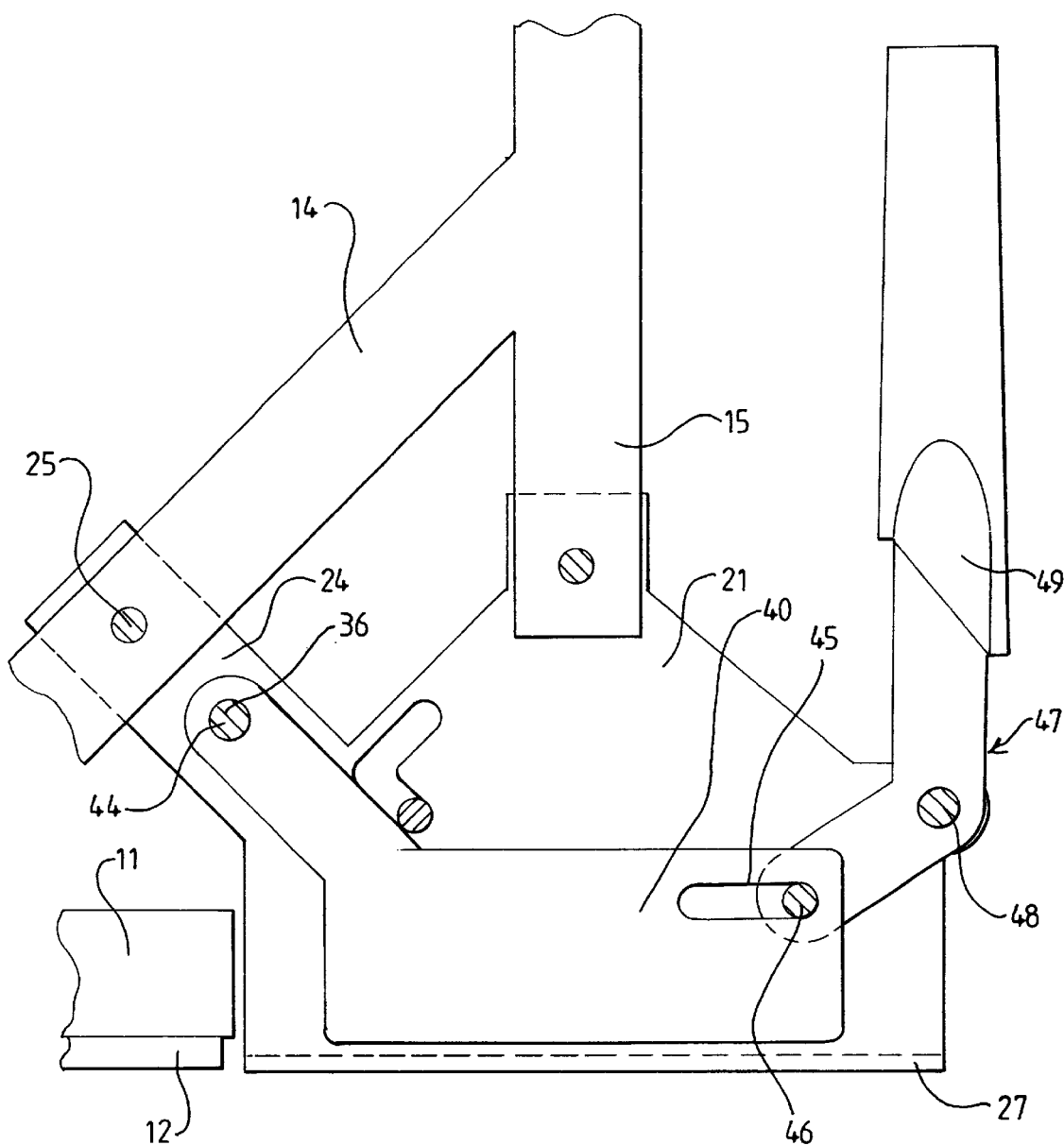
FIG. 3 is a view corresponding to FIG. 2 showing the device in a second condition, but with one plate removed from the sake of clarity of illustration.

Referring initially to FIG. 1 of the accompanying drawings, a track 1 adapted to be mounted in the floor of a motor vehicle comprises an extrusion 2 of an appropriate metal. The extrusion defines a planar under-surface 3 adapted to be secured to the floor of a vehicle and an upper surface 4 which may be substantially flush with the surface of the vehicle. A central slot 5 is provided in the track which communicates with an under-cut channel 6. The track thus presents two inwardly directed lips 7,8, on either side of the slot 5.

A seat support 10 is shown in FIG. 2. The seat support 10 comprises a framework. The framework comprises a lower horizontal portion 11 formed, in this embodiment, of a rigid tube. A protrusion 12 is provided on the under-surface of the lower portion 11 which is adapted to be engaged in the slot 5 formed in the track as a sliding fit. The lower portion 11 is connected directly to a first vertical or upright member 13 and, by means of a sloping inter-connecting tube 14, to a second vertical or upright member 15. The vertical or upright members 15 are in the form of rigid tubes which are inter-connected, at their upper ends, by an upper horizontal tube 16. The upper tube 16 is adapted to be secured to the under-side of a seat. Thus, for example, vertical bores may be provided in the upper tube 16 adapted to receive screws, bolts or the like to secure the upper tube 16 to the squab of a seat.

The lower end of the upright tube 15, which extends beneath the connection between the upright tube 15 and the inclined connecting tube 14, carries a clamping mechanism 17 adapted to occupy an engaging position in which it engages a track 1 of the type described above, to clamp the described frame 10 in position, and to occupy a release position in which the seat support may be slid along a track 1, or may be engaged/disengaged with the track 1.

Figures 4, 5:
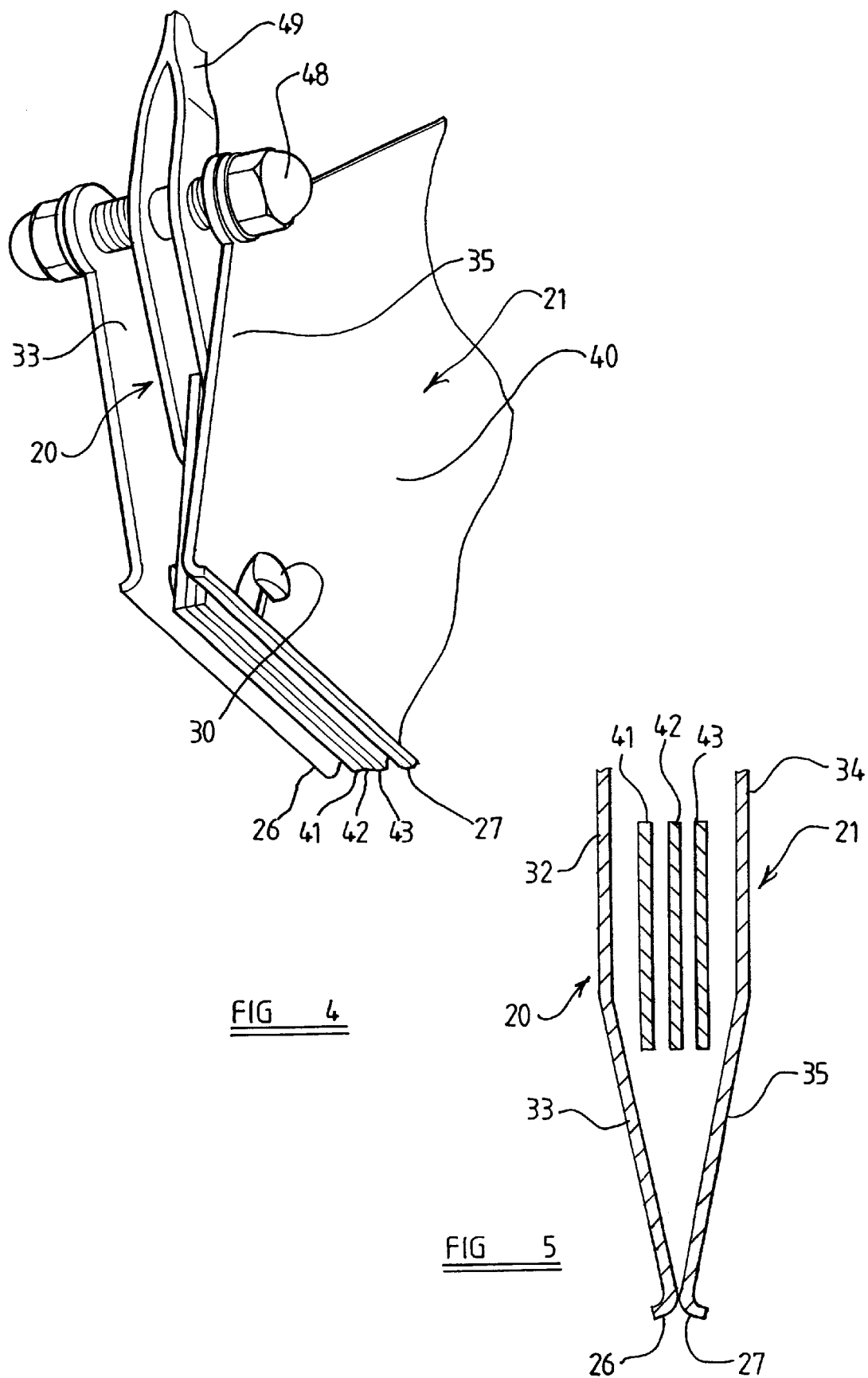
FIG. 4 is a perspective view of an end part of the support of FIGS. 1 and 2 in the second condition.
FIG. 5 is a sectional view taken on the line V—V of FIG. 2.

The clamping mechanism 17 comprises two spaced apart, parallel substantially, vertical, substantially identical plates 20,21 (see FIG. 4). Each plate has an upper region 22 which is secured to the lower end of the upright member 15 by means of a bolt 23, and also has a laterally and upwardly extending arm 24 which is connected to the sloping inter-connecting tube 14 by means of a bolt 25. The plates 20,21 each have a lower edge which terminates adjacent the protrusion 12, and in alignment therewith, the lower edge of the plate 20 carrying an outwardly directed and integrally formed flange 26 and the lower edge of the plate 21 carrying an outwardly directed integrally formed flange 27. The flanges are directed outwardly away from each other. Just above the flange 26 two outwardly directed projections 28,29 are formed on the plate 20, and equivalent projections (only one of which, 30 is visible in FIG. 4) are formed on the plate 21.

The plates are not planar plates, as can be seen most clearly in FIG. 5, the plate 20 has a planar substantially vertical upper region 32, and an inwardly inclined lower region 33. The plate 21 is of a similar form having a vertical upper region 34 and an inwardly inclined lower region 35. The inwardly inclined lower regions 33,35 are resiliently biased inwardly, due to the natural inherent resilience of the plates 20,21 so that the portions of the plates supporting the outwardly directed flanges 26,27 substantially contact each other. The flanges are then positioned so that the flanges may be inserted between the lips 7,8 of the channel 6, passing through the slot 5.

The seat support 10 may thus be brought into a sliding engagement with the track 1.

Pivotally mounted between the plates 20,21 is a knife element 40. The knife element is formed, as can be seen most clearly from FIG. 4, from three adjacent sheets of metal such as steel 41,42,43, the outer-most sheets of which are so configured that the central portions of the sheets are biased resiliently outwardly.

The knife element 40 is pivotally mounted, by means of a pivot shaft 44 to the arms 24 of the two plates. The other end of the knife element has a slot 45. A pivot 46, at one end of a lever 47 passes through the slot 45. The lever 47 has a central portion pivotally connected by means of a pivot 48 to part of the plates 20,21 opposed to the arms 24. The lever 47 has an extending operating handle 49 which extends beyond the plates 20,21.

A safety catch 51 is provided. The catch comprises a bolt 52 which extends through two co-aligned "L"-shaped apertures 53 formed in the plates 20,21 in the region of the pivot point 36.

It is to be appreciated that the bolt 52 may move between the two ends of the co-aligned "L"-shaped apparatus 53.

When the clamping mechanism 17 is in the initial condition, as shown in FIG. 2, the knife 40 is an elevated position and is thus not located between the inwardly inclined regions 33,35 of the plates 20,21, but is spaced above the inwardly inclined regions of the plates 20,21. The lower edges of the plate 20,21 carrying the flanges 26,27 are thus resiliently biased inwardly enabling the flanges to be inserted through the slot 5 of the track 1. If the handle 49 of the lever 47 is now moved in an anti-clockwise direction as shown in the accompanying drawings, the knife 40 will pivot in a generally clockwise sense about the pivot axis 44. The knife will thus be moved, between the plates 20,21 with the knife engaging the inwardly inclined lower portions 33,35 of the plates. As the knife continues to move downwardly, the outwardly bowed sheets 41,43 will tend to be moved inwardly, due to the force applied to the knife by the inwardly inclined regions 33,35 will be moved outwardly against their own resilient bias, thus moving the flanges 26,27 to a position in which they engage the under-surfaces of the lips 7 and 8 of the track 1.

As the knife moves in a clockwise direction, the safety catch 51, in the form of the bolt 52 trapped within the "L"-shaped apertures 53 formed in the plates 20,21 will drop, and will then be in a position within the lower arm of the "L"-shaped aperture 53 adjacent part of the pivotally mounted knife 40.

If there is any movement of the handle 49 tending to move the knife 40 back towards the elevated position shown in FIG. 2, the part of the knife 40 adjacent the bolt 52 will trap the bolt within the lower part of the "L"-shaped aperture 53, thus preventing upward movement of the knife 40. It is to be appreciated, therefore, that the bolt 52 acts as a safety catch preventing inadvertent upward movement of the knife 42 away from the clamping position illustrated in FIG. 3.

If it is desired to release the clamping mechanism, the bolt 52 may be moved manually to a position in which it is in the upper arm of the "L"-shaped apertures 53, and then the handle 49 of the lever 47 may be moved from the position shown in FIG. 3 to the position shown in FIG. 2, thus lifting the knife 40 from its position between the inwardly directed parts 33,35 of the blades 20,21, thus permitting the blades to return, under their nature bias, to their initial position, which will release the clamping effect. The seat support may then be moved axially within the channel, or may even be removed from the channel.

The protrusions 28,29,30 provided on the plates 20,21 are adapted to rest on the upper surface 4 of the track 1, when the clamping mechanism 17 is in the released position, to prevent the flanges 26,27 moving to a position within the channel 6 which is too low.

It is to be appreciated that in the described embodiment, when the seat support 10 is mounted on a track 1, and when the clamping mechanism 17 is in the clamping position as shown in FIG. 3, the flanges 26,27 which have a substantial axial extent, firmly engage the lips 7 and 8 provided on the channel over a substantial extent, and consequently the flanges are able to withstand a substantial force, as may be applied to the flanges, should an accident arise.

It is to be appreciated that the clamping mechanism 17 will be located towards the rear of a seat. In the event of a vehicle provided with seats mounted on the described supports being involved in an accident, such as a frontal impact, generally there is a substantial upward force applied to the rear part of the seat as the occupant of the seat is thrown forwardly, but retained by a safety-belt which is connected to the seat. This upward force is transferred, by the upright frame member 15, directly to the plates which carry the outwardly directed flanges 26,27. As mentioned above, the flanges have a substantial axial extent, which helps ensure that the combination of the flanges and the track can withstand the applied load.

Figure 6:
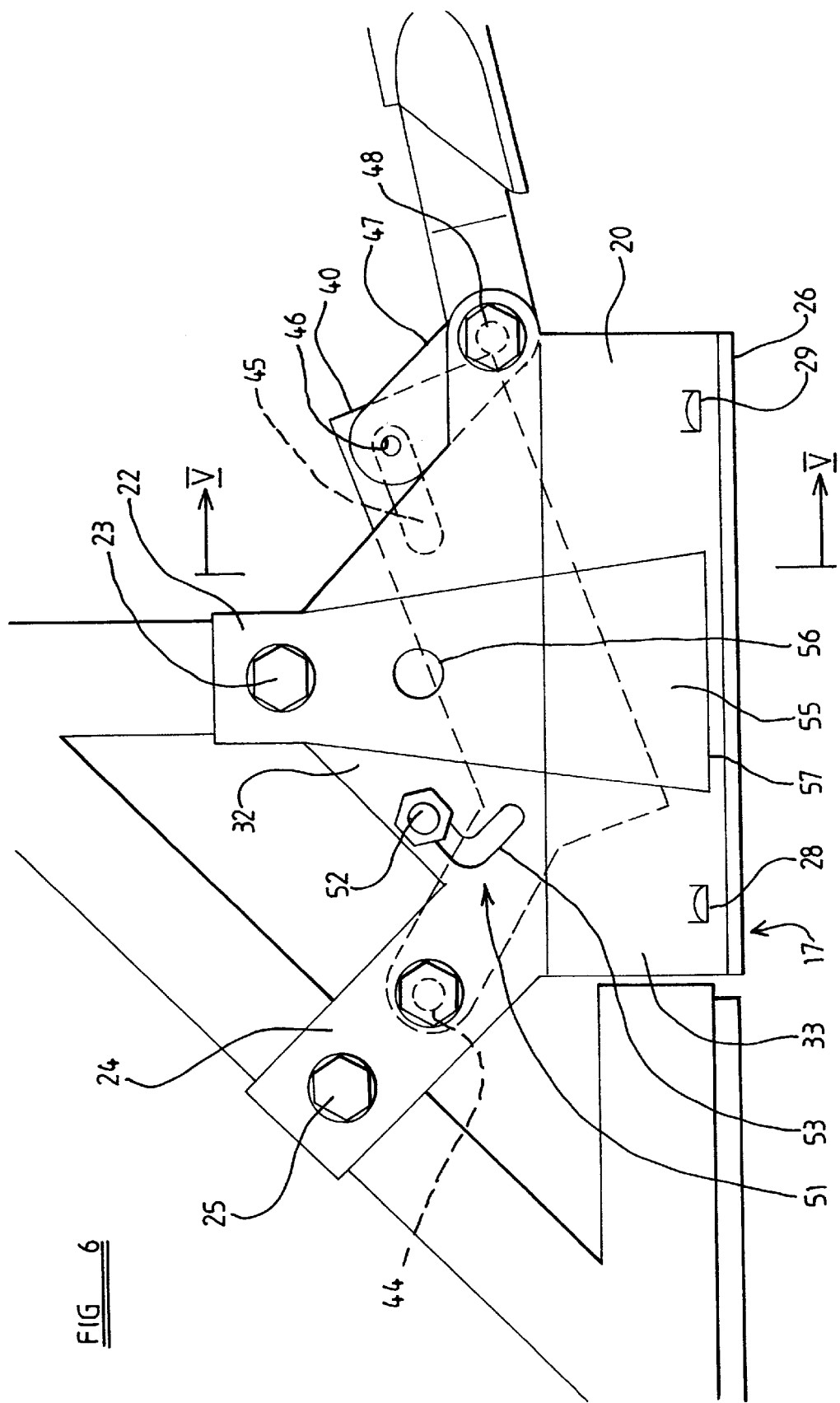
FIG. 6 is a view corresponding to FIG. 2 but with the support arms showing.

In an alternative embodiment shown in FIG. 6 two support arms 55 are provided instead of the protrusions 28,29,30 shown in FIGS. 1 to 5. The support arms 55 will be located adjacent the outer faces of the plates 20,21, being secured by the bolt 23, and each having a lower edge positioned to rest on the upper edge of the track when the clamping mechanism is in the release position to prevent the flanges 26,27 moving to a position within the channel 6 which is too low.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realising the invention in diverse forms thereof.

What is claimed is:

1. A seat support apparatus for use with a seat on a floor of a vehicle, the apparatus comprising:
   a track having two inwardly directed lips on opposite sides of a slot;

a framework having a clamping mechanism suitable for engaging said lips of said track, said clamping mechanism having two spaced apart plates, each of said plates having an inwardly inclined lower region, a lowermost edge of each plate carrying an outwardly directed flange; and a means for moving the lower regions outwardly against an inherent resistance bias provided by said plates from an initial position in which the flanges are insertable between said lips of said track to an outer clamping position in which the flanges engage said lips of said track.

2. The apparatus of claim 1, further comprising:

a knife element mounted between said plates, said knife element movable between an upper position in which said knife element permits the lowermost edges of respective said plates to be biased inwardly and a lower position in which said knife element forces the lowermost edges outwardly.

3. The apparatus of claim 2, said knife element being pivotably mounted in position.

4. The apparatus of claim 3, further comprising:

a lever having a protruding handle, said lever being connected to said knife element so as to move said knife element pivotally.

5. The apparatus of claim 1, further comprising:

a safety catch means for retaining said knife element in said lower position.

6. The apparatus of claim 5, said safety catch means comprising:

an element extending transversely between said plates, said element guided within an elongated aperture of a predetermined configuration, said element being movable between first position preventing upward movement of said knife element from said lower position and a second position permitting upward movement of said knife element from said lower position.

7. The apparatus of claim 1, said framework having a lower part provided with a protrusion substantially aligned with the flanges, said protrusion being inserable into said slot of said track.

8. The apparatus of claim 1, said framework further comprising:

two vertical elements supporting an upper horizontal element, said horizontal element having a means for connecting said horizontal element to a seat, said clamping mechanism connected to a lower part of one of said two vertical elements.

9. The apparatus of claim 1, further comprising:

means on or adjacent said plate for resting on an upper surface of said track when said clamping mechanism is in a release position.

\* \* \* \* \*